United States Patent
Fröberg Olsson et al.

(10) Patent No.: US 12,225,574 B2
(45) Date of Patent: Feb. 11, 2025

(54) PRIORITY-DEPENDENT UCI RESOURCE DETERMINATION

(71) Applicant: Telefonaktiebolaget LM Ericsson (publ), Stockholm (SE)

(72) Inventors: Jonas Fröberg Olsson, Ljungsbro (SE); Kittipong Kittichokechai, Järfälla (SE); Yufei Blankenship, Kildeer, IL (US); Ali Behravan, Stockholm (SE); Bikramjit Singh, Kirkkonummi (FI); Mattias Andersson, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 584 days.

(21) Appl. No.: 17/601,255

(22) PCT Filed: Apr. 2, 2020

(86) PCT No.: PCT/IB2020/053153
§ 371 (c)(1),
(2) Date: Oct. 4, 2021

(87) PCT Pub. No.: WO2020/202068
PCT Pub. Date: Oct. 8, 2020

(65) Prior Publication Data
US 2022/0183025 A1    Jun. 9, 2022

Related U.S. Application Data

(60) Provisional application No. 62/828,309, filed on Apr. 2, 2019.

(51) Int. Cl.
*H04W 72/566* (2023.01)
*H04L 1/1829* (2023.01)
(Continued)

(52) U.S. Cl.
CPC ......... *H04W 72/569* (2023.01); *H04L 1/1864* (2013.01); *H04L 5/0064* (2013.01); *H04W 72/21* (2023.01); *H04W 72/23* (2023.01)

(58) Field of Classification Search
CPC ... H04W 72/569; H04W 72/21; H04W 72/23; H04L 1/1864; H04L 5/0064;
(Continued)

(56) References Cited

U.S. PATENT DOCUMENTS

| | | | |
|---|---|---|---|
| 2021/0051509 A1* | 2/2021 | Wu | H04L 1/1887 |
| 2021/0068100 A1* | 3/2021 | Takeda | H04W 72/21 |
| 2021/0321394 A1* | 10/2021 | Li | H04L 1/007 |

FOREIGN PATENT DOCUMENTS

| | | |
|---|---|---|
| CN | 102484869 A | 5/2012 |
| CN | 107852289 A | 3/2018 |

(Continued)

OTHER PUBLICATIONS

Author Unknown, "Technical Specification Group Radio Access Network; NR; Radio Resource Control (RRC) protocol specification (Release 15)," Technical Specification 38.331, Version 15.4.0, Dec. 2018, 3GPP Organizational Partners, 474 pages.

(Continued)

*Primary Examiner* — Mandish K Randhawa
(74) *Attorney, Agent, or Firm* — Withrow & Terranova, PLLC

(57) ABSTRACT

Systems and methods for priority-dependent Uplink Control Information (UCI) resource determination are provided. In some embodiments, a wireless device determines that one or more UCIs are to be multiplexed onto a Physical Uplink Shared Channel (PUSCH); determines priorities of the PUSCH and/or each of the one or more UCIs; determines at least one beta offset value for one or more UCIs based on one or more of the priorities; set or adjust a UCI code rate (Continued)

based on the at least one beta offset value; and transmit a UCI according to the UCI code rate. This provides a simple and consistent method to deduce beta offset value for UCI based on priorities of UCI and PUSCH. The solution supports possible multiple different beta offset values determined without extra explicit signaling, i.e., it helps to reduce DCI bits needed to indicate potentially multiple beta offset values.

25 Claims, 5 Drawing Sheets

(51) Int. Cl.
    *H04L 5/00*            (2006.01)
    *H04W 72/21*         (2023.01)
    *H04W 72/23*         (2023.01)

(58) Field of Classification Search
    CPC ... H04L 1/0042; H04L 5/0044; H04L 5/0053; H04L 1/0075; H04L 5/0091; H04L 1/007; H04L 5/0057; H04L 1/0072; H04L 5/0007; H04L 5/0055; H04L 1/1896; H04L 5/0051
    See application file for complete search history.

(56) References Cited

FOREIGN PATENT DOCUMENTS

| | | |
|---|---|---|
| CN | 108566267 A | 9/2018 |
| WO | 2018165347 A1 | 9/2018 |
| WO | 2018231728 A1 | 12/2018 |
| WO | WO-2019137213 A1 * | 7/2019 ............... H04L 1/06 |

OTHER PUBLICATIONS

First Office Action for Chinese Patent Application No. 202080040835.3, mailed Jan. 9, 2024, 14 pages.

Examination Report for European Patent Application No. 20718811.1, mailed Jun. 22, 2023, 6 pages.

Author Unkown, "Technical Specification Group Radio Access Network; NR; Multiplexing and channel coding (Release 15)," Technical Specification 38.212, Version 15.5.0, Mar. 2019, 3GPP Organizational Partners, 101 pages.

Author Unkown, "Technical Specification Group Radio Access Network; NR; Physical layer procedures for control (Release 15)," Technical Specification 38.213, Version 15.4.0, Dec. 2018, 3GPP Organizational Partners, 104 pages.

CMCC, "R1-1902337: Discussion on intra-UE multiplexing," 3GPP TSG RAN WG1 #96, Feb. 25-Mar. 1, 2019, Athens, Greece, 4 pages.

Ericsson, "R1-1805168: On PUCCH/SPUCCH reliability for URLLC," 3GPP TSG RAN WG1 Meeting 92b, Apr. 16-20, 2018, Sanya, China, 10 pages.

International Search Report and Written Opinion for International Patent Application No. PCT/IB2020/053153, mailed Jul. 23, 2020, 12 pages.

International Preliminary Report on Patentability for International Patent Application No. PCT/IB2020/053153, mailed May 14, 2021, 11 pages.

* cited by examiner

PRIORITY-DEPENDENT UCI RESOURCE DETERMINATION

RELATED APPLICATIONS

This application is a 35 U.S.C. § 371 national phase filing of International Application No. PCT/IB2020/053153, filed Apr. 2, 2020, which claims the benefit of provisional patent application Ser. No. 62/828,309, filed Apr. 2, 2019, the disclosures of which are hereby incorporated herein by reference in their entireties.

TECHNICAL FIELD

The current disclosure relates to transmitting uplink control information.

BACKGROUND

Ultra-Reliable and Low Latency Communication (URLLC) is one of the main use cases of Fifth Generation (5G) New Radio (NR). URLLC has strict requirements on transmission reliability and latency, i.e., 99.9999% reliability within 1 ms one-way latency. In NR Rel-15, several new features and enhancements were introduced to support these requirements. In Rel-16, standardization works are focused on further enhancing URLLC system performance as well as ensuring reliable and efficient coexistence of URLLC and other NR use cases. One example scenario is when a User Equipment (UE) supports both Enhanced Mobile Broadband (eMBB) traffic and URLLC traffic and therefore requires a method to handle multiplexing and/or prioritization of these kinds of traffic.

NR supports multiplexing of Uplink Control Information (UCI) on a Physical Uplink Shared Data Channel (PUSCH) where UCI can include Aperiodic Channel State Information (A-CSI) and Hybrid Automatic Repeat Request Acknowledgement (HARQ-ACK) feedback. Due to the nature of multiplexing multiple data types onto limited resources, NR supports a mechanism to adjust a code rate of UCI through a so-called beta offset parameter such that the UCI code rate can be further reduced making UCI to be multiplexed on PUSCH more robust. The code rate refers to the ratio between the transport block size and the total number of physical layer bits per subframe that are available for transmission of that transport block. A lower code rate means that more redundancy bits are inserted during the channel coding process, and a higher code rate means that less redundancy bits are inserted.

According to clause 9.3 in the Third Generation Partnership Project (3GPP) Technical Specification (TS) 38.213, separate beta offset values for Channel State Information (CSI) and HARQ-ACK are indicated in DCI or semi-statically configured by higher layer parameters. For dynamic indication in DCI, DCI format 0_1 contains a 2-bit beta offset indicator pointing to a set of beta offsets for HARQ-ACK and CSI according to the mapping in Table 9.3-3. If the DCI scheduling PUSCH does not contain a beta offset indicator, the UE applies beta offsets following the configured values according to the higher layer parameter.

To support UCI multiplexing on PUSCH for UE supporting both URLLC and eMBB, where UCI corresponding to eMBB may be multiplexed on URLLC PUSCH, it has been proposed that new beta offset values are proposed that could be introduced such that UCI code rate is adjusted to have higher rate or even dropped to reduce the impact on PUSCH reliability.

In Rel-16, it has been proposed that there might exist a priority indicator at the physical layer to facilitate prioritization of data with different level of requirements.

For example, if a UE is scheduled to transmit aUL data with normal priority level on one resource but at the same time has a new data arriving with higher priority (e.g., with ultra-low latency requirement), tt may happen that UE uses priority information at the physical layer to prioritize the low-latency data over the normal one. Having priority information available at the physical layer would facilitate such a prioritization process. One possible option for such information is to have an explicit priority indicator in DCI.

Radio Resource Control (RRC) configuration of beta and scaling factors of UCI for dynamically scheduled PUSCH is as follows:

| PUSCH-Config information element |
| --- |
| -- ASN1START |
| -- TAG-PUSCH-CONFIG-START |
| ... |
| UCI-OnPUSCH ::=    SEQUENCE { |
|    betaOffsets           CHOICE { |
|       dynamic              SEQUENCE (SIZE (4)) OF BetaOffsets, |
|       semiStatic           BetaOffsets |
|    }                     OPTIONAL, -- Need M |
|    scaling               ENUMERATED { f0p5, f0p65, f0p8, f1 } |
| } |

| UCI-OnPUSCH field descriptions |
| --- |
| beta Offsets |
| Selection between and configuration of dynamic and semi-static beta offset. If the field is absent or released, the UE applies the value 'semiStatic' and the BetaOffsets according to FFS [BetaOffsets and/or clause 9.x.x] (see TS 38.213 [13], clause 9.3). |
| scaling |
| Indicates a scaling factor to limit the number of resource elements assigned to UCI on PUSCH. Value f0p5 corresponds to 0.5, value f0p65 corresponds to 0.65, and so on. The value configured herein is applicable for PUSCH with configured grant (see TS 38.212 [17], clause 6.3). |

RRC configuration of beta and scaling factors of UCI for Configured Grant (CG) scheduled PUSCH is as follows:

---
ConfiguredGrantConfig information element
---
-- ASN1START
-- TAG-CONFIGUREDGRANTCONFIG-START
...
CG-UCI-OnPUSCH ::=    CHOICE {
      dynamic              SEQUENCE (SIZE (1..4))
                           OF BetaOffsets,
      semiStatic           BetaOffsets
}
---

One example of using the beta factor and the scaling factor is illustrated below, using HARQ-ACK bits:

For HARQ-ACK transmission on PUSCH with Uplink (UL)-Shared Channel (SCH), the number of coded modulation symbols per layer for HARQ-ACK transmission, denoted as $Q'_{ACK}$, is determined as follows:

$$Q'_{ACK} = \min \left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\}$$

Where: $O_{ACK}$ is the number of HARQ-ACK bits; if $O_{ACK} \geq 360$, $L_{ACK}=11$; otherwise $L_{ACK}$ is the number of Cyclic Redundancy Check (CRC) bits for HARQ-ACK determined according to Subclause 6.3.1.2.1; $\beta_{offset}^{PUSCH} = \beta_{offset}^{HARQ-ARK}$; $C_{UL-SCH}$ is the number of code blocks for UL-SCH of the PUSCH transmission; if the DCI format scheduling the PUSCH transmission includes a Code Block Group Transmission Information (CBGTI) field indicating that the UE shall not transmit the r-th code block, $K_r=0$; otherwise, $K_r$ is the r-th code block size for UL-SCH of the PUSCH transmission; $M_{sc}^{PUSCH}$ is the scheduled bandwidth of the PUSCH transmission, expressed as a number of subcarriers; $M_{sc}^{PT-RS}(l)$ is the number of subcarriers in Orthogonal Frequency Division Multiplexing (OFDM) symbol l that carries a Phase Tracking Reference Signal (PTRS), in the PUSCH transmission; $M_{sc}^{UCI}(l)$ is the number of resource elements that can be used for transmission of UCI in OFDM symbol l, for $l=0, 1, 2, \ldots, N_{symb,all}^{PUSCH}-1$, in the PUSCH transmission and $N_{symb,all}^{PUSCH}$ is the total number of OFDM symbols of the PUSCH, including all OFDM symbols used for a Demodulation Reference Signal (DMRS); for any OFDM symbol that carries DMRS of the PUSCH, $M_{sc}^{UCI}(l)=0$; for any OFDM symbol that does not carry DMRS of the PUSCH, $M_{sc}^{UCI}(l)=M_{sc}^{PUSCH}-M_{sc}^{PT-RS}(l)$; $\alpha$ is configured by higher layer parameter scaling, $l_0$ is the symbol index of the first OFDM symbol that does not carry DMRS of the PUSCH, after the first DMRS symbol(s), in the PUSCH transmission.

In Rel 15, the beta factor used is determined in the following way as described in 38.213 v 15.4.0 section 9.3. Specifically, Table 9.3-1 illustrates: Mapping of beta_offset values for HARQ-ACK information and the index signalled by higher layers; and Table 9.3-3 illustrates: Mapping of beta_offset indicator values to offset indexes.

There currently exist certain challenges. When there are multiple UCIs (e.g., CSI and multiple HARQ-ACK bits) with different priority levels to be multiplexed on PUSCH, the use of beta offset as in current specification can be very complicated. For example, multiple beta offset indicators would have to be indicated resulting in more bits required for beta offset indicator in the DCI. Improved systems and methods for UCI resource determination are needed.

SUMMARY

Systems and methods for priority-dependent Uplink Control Information (UCI) resource determination are provided. In some embodiments, a method of operating a wireless device for priority-dependent UCI resource determination includes determining that one or more UCIs are to be multiplexed onto a Physical Uplink Shared Channel (PUSCH); determining priorities of the PUSCH and/or each of the one or more UCIs; determining at least one beta offset value for at least one of the UCIs based on one or more of the priorities of the PUSCH and each of the plurality of UCIs; setting or adjusting a UCI code rate based on the at least one beta offset value; and transmitting the UCI according to the UCI code rate. This provides a simple and consistent method to deduce beta offset value for UCI based on priorities of UCI and PUSCH. The solution supports possible multiple different beta offset values determined without extra explicit signaling, i.e., it helps to reduce DCI bits needed to indicate potentially multiple beta offset values.

Certain aspects of the present disclosure and their embodiments may provide solutions to the aforementioned or other challenges.

The present disclosure provides solutions for determining beta offset values for UCI to be multiplexed on a PUSCH based on the priorities of UCI and the PUSCH. The solutions can be extended to support multiplexing of multiple UCIs with different priority values on PUSCH without requiring extra bits for beta offset indicators in the DCI.

Some embodiments of the present disclosure propose that a beta offset value for a UCI is determined based on the priority values of the UCI and the PUSCH to be multiplexed on. In some cases, depending on the priority values, the determined beta offset value can correspond to dropping the UCI or PUSCH. The present disclosure assumes that priority information of the UCIs and the PUSCH are available to the UE (e.g., through semi-static configured value or indicated in the DCI scheduling PUSCH) when UCI is to be multiplexed on PUSCH.

Certain embodiments may provide one or more of the following technical advantage(s). The solution proposed in the present disclosure provides a simple and consistent method to deduce beta offset value for a UCI based on the priorities of UCI and PUSCH. The solution supports possible multiple different beta offset values determined without extra explicit signaling, i.e., it helps to reduce DCI bits needed to indicate potentially multiple beta offset values.

In some embodiments, the beta offset value for UCI comprises a beta offset value for Hybrid Automatic Request Acknowledge (HARQ-ACK) or a beta offset value for Channel State Information, CSI. In some embodiments, determining the at least one beta offset value for UCI comprises determining beta offset values for the plurality of UCI messages based on one or more of the priorities of the PUSCH and each of the plurality of UCIs.

In some embodiments, the beta offset value of each of the plurality of UCIs is determined separately based on the priority of the respective UCI and the PUSCH. In some embodiments, one beta offset is determined for multiple UCIs to be multiplexed on PUSCH based on the priority of all the UCIs and the PUSCH.

In some embodiments, the beta offset value for each of the plurality of UCIs is determined based on an indicated or configured beta factor. In some embodiments, the beta offset value is one of the group consisting of: determined from a table indexed by a combination of UCI and PUSCH priorities; determined from a defined formula that considers a combination of UCI and PUSCH priorities; and determined based on higher layer priorities.

In some embodiments, a UCI or PUSCH priority is explicitly indicated in the Download Control Information, DCI, semi-statically configured, and/or derived from other indicators. In some embodiments, a PUSCH priority is explicitly indicated in an UL scheduling grant or activation grant or is semi-statically configured.

In some embodiments, HARQ-ACK for a Physical Downlink Shared Channel, PDSCH, has the same priority as the priority of PDSCH. In some embodiments, a PDSCH priority is indicated in the Downlink (DL) scheduling DCI. In some embodiments, a PDSCH priority is semi-statically configured.

In some embodiments, an Aperiodic CSI (A-CSI) has the same priority as the priority indicator in a UL grant requesting the CSI. In some embodiments, the A-CSI always has the lowest priority with respect to other UCI and PUSCH. In some embodiments, the priority of the A-CSI is semi-statically configured. In some embodiments, the beta offset of the A-CSI is identical to or is derived from the beta offset indicator in the DCI.

In some embodiments, the beta offset of the A-CSI is determined from a combination of a beta offset indicator in the DCI and a priority of the PUSCH. In some embodiments, a priority of a specific A-CSI that is determined based on a PDSCH Demodulation Reference Signal, DMRS, to be multiplexed on PUSCH is the same as the priority of the PDSCH.

In some embodiments, the beta offset value for a UCI multiplexed in PUSCH is determined based on the configuration used, wherein the configuration used comprises a configuration type or number used in UL with multiple Configured Grants, CGs. In some embodiments, different configurations carry different traffic with different reliabilities or priorities.

In some embodiments, a dynamic grant follows a failed UL transmission in a CG, the determination of beta offset value for the UCI transmitted in the PUSCH utilizes the information for a given CG where the initial UL transmission happened out of multiple CGs.

In some embodiments, the beta offset value for the first transmission opportunity in the CG period is combined with a priority value to determining beta offset value.

In some embodiments, a wireless device for priority-dependent UCI resource determination includes one or more processors and memory. The memory stores instructions executable by the one or more processors, whereby the wireless device is operable to: determine that one or more UCIs are to be multiplexed onto a PUSCH; determine priorities of the PUSCH and/or each of the one or more UCIs; determine at least one beta offset value for one or more UCIs based on one or more of the priorities of the PUSCH and/or each of the plurality of UCIs; set or adjust a UCI code rate based on the at least one beta offset value; and transmit a UCI according to the UCI code rate.

In some embodiments, the wireless device is further operable to perform any of the methods disclosed herein.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1:
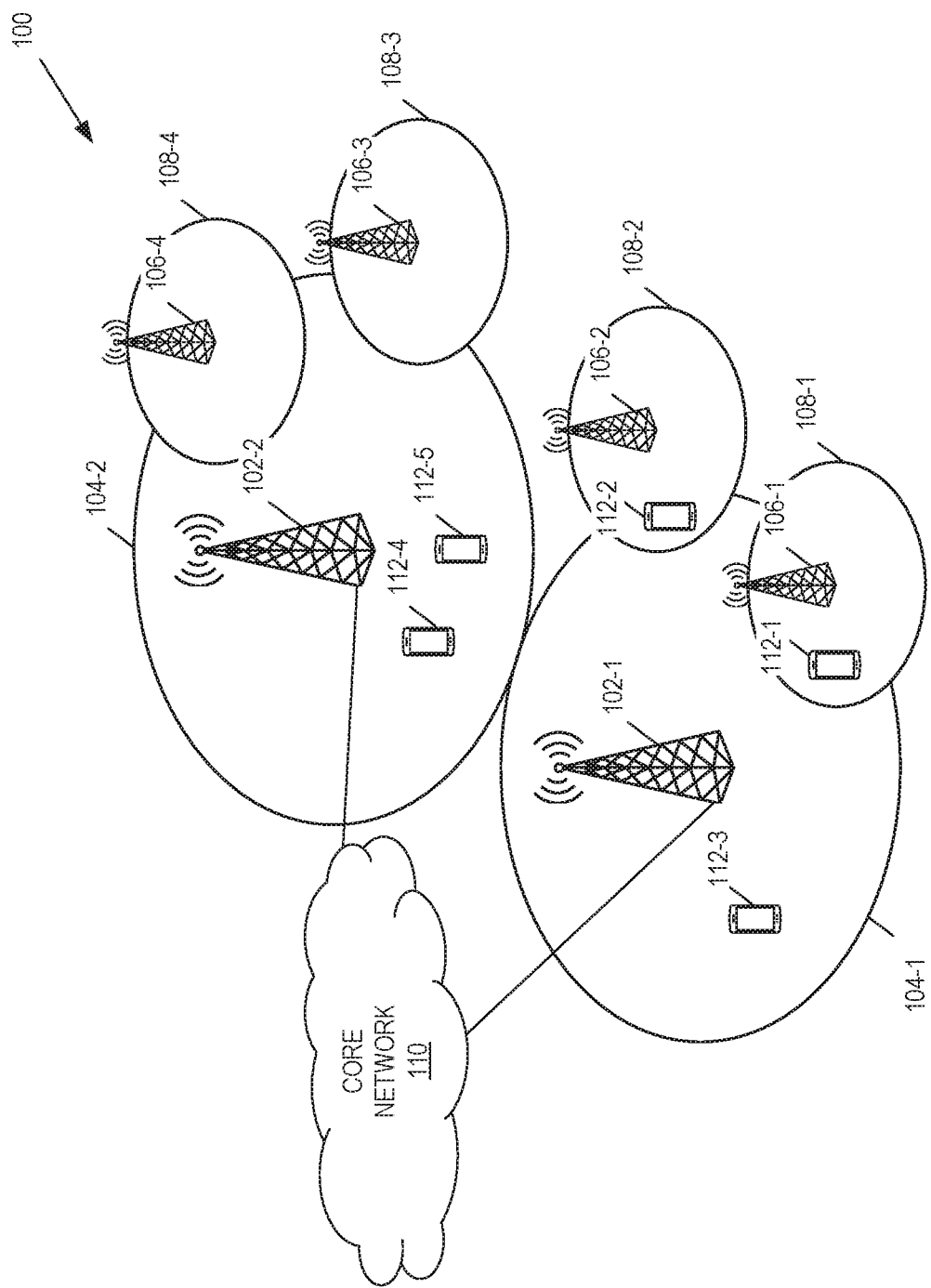
FIG. 1 illustrates one example of a cellular communications network, according to some embodiments of the present disclosure.

FIG. 1 illustrates one example of a cellular communications network 100 according to some embodiments of the present disclosure. In the embodiments described herein, the cellular communications network 100 is a 5G NR network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

When there are multiple Uplink Control Informations (UCIs) (e.g., Channel State Information (CSI) and multiple Hybrid Automatic Repeat Request Acknowledge (HARQ-ACK) bits) with different priority levels to be multiplexed on a Physical Uplink Shared Channel (PUSCH), the use of beta offsets as in the current specification can be very complicated. For example, multiple beta offset indicators would have to be indicated, resulting in more bits required for beta offset indicators in the Downlink Control Information (DCI). Improved systems and methods for UCI resource determination are needed.

Figure 2:
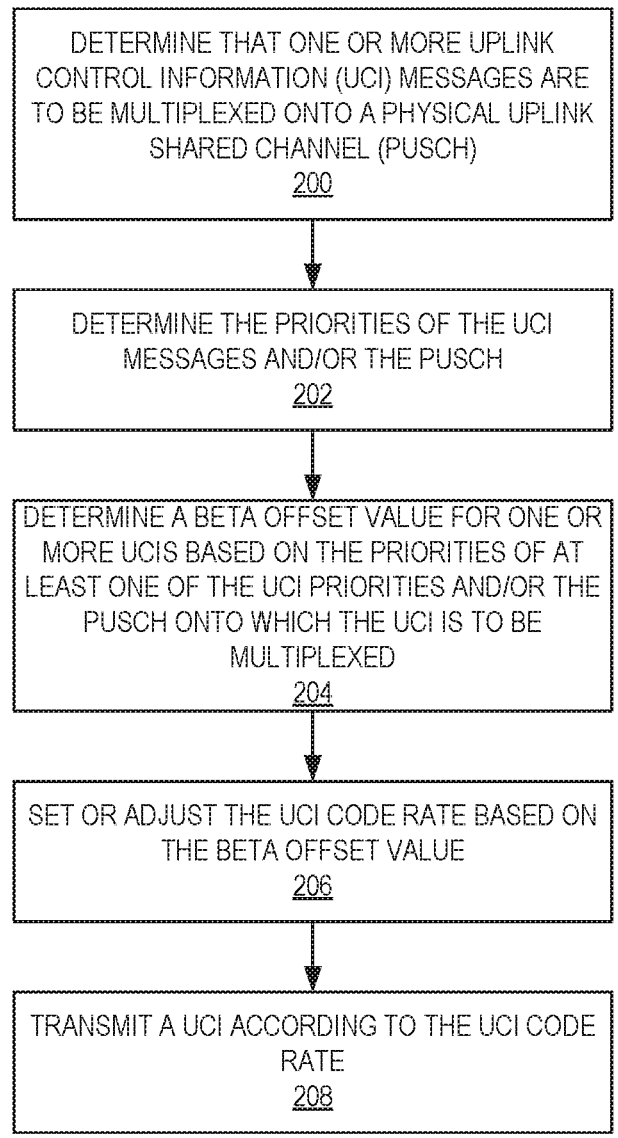
FIG. 2 illustrates a method performed by a wireless device for priority-dependent Uplink Control Information (UCI) resource determination, according to some embodiments of the present disclosure.

Systems and methods for priority-dependent UCI resource determination are provided. FIG. 2 illustrates an example operation of a wireless device according to some embodiments of the present disclosure. In some embodiments, a method of operating a wireless device for priority-dependent UCI resource determination includes determining that a plurality of UCI messages are to be multiplexed onto a Physical Uplink Shared Channel (PUSCH) (step 200). The wireless device determines priorities of the PUSCH and of each of the plurality of UCIs (step 202). Then, the wireless device determines at least one beta offset value for at least one of the UCIs based on one or more of the priorities of the PUSCH and each of the plurality of UCIs (step 204). The wireless device sets or adjusts a UCI code rate based on the at least one beta offset value (step 206). The wireless device transmits a UCI according to the UCI code rate (step 208). This provides a simple and consistent method to deduce beta offset values for UCI based on priorities of UCIs and PUSCH. The solution supports possible multiple different beta offset values determined without extra explicit signaling, i.e., it helps to reduce DCI bits needed to indicate potentially multiple beta offset values. In some embodiments, there is a beta offset value per UCI type (HARQ-ACK or CSI) and each type can also be associated with a priority. A beta offset value for UCI (HARQ-ACK or CSI) tells the wireless device how to determine resources for the UCI. Hence, in some embodiments, there is a code rate associated per UCI (type). In some embodiments, an overall code rate for the total UCI (including both HARQ-ACK and CSI) is determined.

In some embodiments, if one UCI is multiplexed onto a PUSCH, then the beta offset value of the UCI is determined based on the priority of the UCI and/or the priority of the PUSCH. On the other hand, if there are multiple UCIs to be multiplexed onto a PUSCH, then one or more beta offset values for these multiple UCIs are determined based on the priority values of the UCIs and/or the priority value of the PUSCH.

In some embodiments, two levels of priority values are defined in the specification TS 38.213. Priority of a HARQ-ACK codebook with index 0 corresponds to low priority, while priority index 1 corresponds to high priority. In some embodiments, if there are two HARQ-ACK codebooks, then the first HARQ-ACK codebook is associated with priority index 0 (low priority) while second HARQ-ACK codebook is associated with priority index 1 (high priority). In some embodiments, there can be one HARQ-ACK codebook which can be associated with both priorities. For example, a single HARQ-ACK codebook can first be used for one or more HARQ-ACKs associated with priority index 1 and then (after that first use) be used for one or more HARQ-ACKs associated with priority index 0.

In one embodiment, beta offset value of a UCI (HARQ-ACK or CSI) is determined based on priority of the UCI and/or PUSCH that the UCI is to be multiplexed on.

In one embodiment, multiple beta offset values for multiple UCIs (multiple HARQ-ACK and/or multiple CSI) to be multiplexed on PUSCH are determined separately based on priority of each UCI and the PUSCH.

In another embodiment, one beta offset value is determined for multiple UCIs to be multiplexed on PUSCH based on priority of all the UCIs and the PUSCH.

In one embodiment, beta offset values for different UCI messages are determined based on one indicated or configured beta factor, e.g., beta_1=2*beta_2.

In one embodiment, a field beta offset indicator is not included in the new specific DCI for URLLC. In other words, a beta offset value could be determined based on priorities if there is no field in the new specific DCI.

In one embodiment, a beta offset value of UCI is determined from a table indexed by a combination of priorities of UCI and PUSCH.

In another embodiment, a beta offset value of UCI is determined from a defined formula considering a combination of priority of UCI and Physical Downlink Shared Channel (PDSCH). In some embodiments, a beta offset value can be determined from a specified function f, i.e., for the case of one UCI multiplexed on PUSCH, the beta offset value=f(the priority value of the UCI, the priority value of the PUSCH).

In one embodiment, a priority of UCI is implicitly determined based on higher layer data priorities, e.g., a priority of the corresponding DL data or priority of the accompanying UL data, etc.

In one embodiment, a priority of UCI and/or PUSCH can be explicitly indicated in the DCI, or semi-statically configured, or derived from other indicators.

In one embodiment, a priority of PUSCH is indicated in the UL scheduling grant or activation grant.

In another embodiment, a priority of PUSCH is semi-statically configured.

In one embodiment, HARQ-ACK for a PDSCH has the same priority as the priority of PDSCH.

In one embodiment, a priority of PDSCH is indicated in the DL scheduling DCI.

In another embodiment, a priority of PDSCH is semi-statically configured.

In one embodiment, aperiodic CSI (A-CSI) has the same priority as the priority indicator in UL grant requesting the CSI.

In another embodiment, A-CSI always has the lowest priority with respect to other UCI and PUSCH.

In another embodiment, priority of A-CSI is semi-statically configured.

In one embodiment, a beta offset value of A-CSI is the same as the beta offset indicator in the DCI.

In another embodiment, a beta offset of A-CSI is determined from a combination of the beta offset indicator in the DCI and priority of PUSCH.

In one embodiment, a priority of specific A-CSI determined based on PDSCH DMRS to be multiplexed on PUSCH is the same as priority of PDSCH.

In one embodiment, the beta offset value for a UCI multiplexed in PUSCH is determined based on the configuration used. Configuration is described herein as configuration type or number used in uplink (UL) with multiple Configured Grants (CGs). Different configurations may carry different traffic with different reliabilities or priorities. In some embodiments, this is applied to UL configured grant PUSCH. There can be multiple active configurations of configured grant PUSCH. In some embodiments, the beta offset value determination also depends on the configuration index of the configured grant PUSCH.

In one embodiment, where a dynamic grant may follow the failed UL transmission in CG, the determination of a beta offset value for the UCI transmitted in (retransmission) PUSCH utilizes the information for a given CG where an initial UL transmission happened (type or number) out of multiple CGs. In some embodiments, in case of UCI multiplexed onto a dynamically scheduled PUSCH which is a retransmission of the first CG PUSCH transmission, the beta offset value determination is also based on a configuration index of the first CG PUSCH.

In one embodiment, the offset value for the first transmission occasion in the CG period can be combined with a priority value to determine a beta offset value.

The same concept for multiple UL CGs can be mirrored for multiple DL Semi-Persistent Scheduling (SPS) configurations carrying different reliability traffic streams. Hence beta offset value can consider PDSCHs transmitted over particular DL SPS configurations.

In one embodiment, the priority of PUSCH or PDSCH can be based on the configuration allocated in UL (CG) or DL (SPS) where multiple configurations exist in either or both direction(s).

In one embodiment, the determined beta offset values include a value corresponding to dropping the UCI.

Determining HARQ-ACK Beta Offset From DL and UL Priority

In this exemplifying embodiment, DL and UL priorities are "high" or "low", i.e., a 1-bit priority differentiation is assumed. The UE may be pre-configured with a HARQ-ACK beta factor table according to:

TABLE 1

HARQ-ACK beta factor

| Beta offset index | HARQ-ACK Beta factor |
|---|---|
| "00" | $\beta_1$ |
| "01" | $\beta_2$ |
| "10" | $\beta_3$ |
| "11" | $\beta_4$ |

The beta factor index is in this embodiment referenced by the DL priority P_DL and the UL priority P_UL according to (P_DL, P_UL). That is, the most significant bit of the beta offset index is determined from the DL priority while the least significant bit of the beta offset index is determined by the UL priority. Clearly, in other embodiments, the beta offset index could be referenced by (P_UL, P_DL) instead or some other mapping function from P_DL and P_UL to a beta offset index.

In some embodiments, there are two or more HARQ-ACKs that are transmitted in UCI on a PUSCH with priority P_UL. In some such embodiments, the two or more HARQ-ACKs are associated with two or more PDSCHs with priorities P1_DL, P2_DL, . . . , wherein the UE determines two or more beta offset values for HARQ-ACK by determining multiple beta offset index lookup based on (P1_DL, P_UL), (P2_DL, P_UL), . . . .

In one embodiment, the offset index is determined implicitly from the DL priority P_DL and the UL priority P_UL in the following way. The beta factor is then determined from the beta factor in a manner similar to in Rel-15, perhaps with additional values added to the table mapping the offset index to the beta factor.

| P_DL | U_DL | $I_{offset,0}^{HARQ-ACK}$ or $I_{offset,1}^{HARQ-ACK}$ or $I_{offset,2}^{HARQ-ACK}$ |
|---|---|---|
| 0 | 0 | 1$^{st}$ offset index provided by higher layers |
| 0 | 1 | 2$^{nd}$ offset index provided by higher layers |
| 1 | 0 | 3$^{rd}$ offset index provided by higher layers |
| 1 | 1 | 4$^{th}$ offset index provided by higher layers |

In some versions of the above embodiment, the offset index is not provided by higher layers but instead specified in the specification. In some versions of the above embodiment, an offset index specified in the specification is used unless another index is provided by higher layers, e.g., through RRC configuration.

In one embodiment, the offset index is determined both from the DL priority P_DL and the UL priority P_UL and the beta_offset_indicator in the DCI scheduling the PUSCH. One way of doing this is by using the following table, when the beta factor is then determined from the beta factor in a manner similar to in Rel-15, perhaps with additional values added to the table mapping the offset index to the beta factor.

| Beta_offset_indicator | P_DL | U_DL | $I_{offset,0}^{HARQ-ACK}$ or $I_{offset,1}^{HARQ-ACK}$ or $I_{offset,2}^{HARQ-ACK}$ |
|---|---|---|---|
| '00' | 0 | 0 | $1^{st}$ offset index provided by higher layers |
| '00' | 0 | 1 | $2^{nd}$ offset index provided by higher layers |
| '00' | 1 | 0 | $3^{rd}$ offset index provided by higher layers |
| '00' | 1 | 1 | $4^{th}$ offset index provided by higher layers |
| '01' | 0 | 0 | $5^{th}$ offset index provided by higher layers |
| '01' | 0 | 1 | $6^{th}$ offset index provided by higher layers |
| '01' | 1 | 0 | $7^{th}$ offset index provided by higher layers |
| '01' | 1 | 1 | $8^{th}$ offset index provided by higher layers |
| '10' | 0 | 0 | $9^{th}$ offset index provided by higher layers |
| '10' | 0 | 1 | $10^{th}$ offset index provided by higher layers |
| '10' | 1 | 0 | $11^{th}$ offset index provided by higher layers |
| '10' | 1 | 1 | $12^{th}$ offset index provided by higher layers |
| '11' | 0 | 0 | $13^{th}$ offset index provided by higher layers |
| '11' | 0 | 1 | $14^{th}$ offset index provided by higher layers |
| '11' | 1 | 0 | $15^{th}$ offset index provided by higher layers |
| '11' | 1 | 1 | $16^{th}$ offset index provided by higher layers |

In some versions of the above embodiment, the offset index is not provided by higher layers, but instead specified in the specification. In some versions of the above embodiment an offset index specified in the specification is used unless another index is provided by higher layers, e.g., through RRC configuration.

In some embodiments, a first offset index is obtained similar to in Rel-15. A second offset index used to find the beta factor is then obtained from the first offset index based on the priorities of the UL and DL transmissions.

In one version of the above embodiment, if the UL and DL transmissions have the same priority, the second offset index is the same as the first offset index.

In one version of the above embodiment, if the UL transmission has higher priority than the DL transmission, the second offset index is given by the first offset index minus a fixed non-negative integer. The integer can either be provided by higher layers, e.g., through RRC, or be fixed in the specification.

In one version of the above embodiment, if the second offset index would be negative (i.e., if the fixed non-negative integer is larger than the first offset index), then the second offset index is set to 0. In another version, if the second offset index would be negative (i.e., if the fixed non-negative integer is larger than the first offset index), then the second offset index is set such that the beta factor implies that the associated UCI transmissions is dropped.

In one version of the above embodiment, if the UL transmission has lower priority than the DL transmission, the second offset index is given by the first offset index plus a fixed non-negative integer. The integer can either be provided by higher layers, e.g., through RRC, or be fixed in the specification.

In one version of the above embodiment, if the second offset index would be negative (i.e., if the fixed non-negative integer is larger than the first offset index), then the second offset index is set to 0. In another version, if the second offset index would be negative (i.e., if the fixed non-negative integer is larger than the first offset index), then the second offset index is set such that the beta factor implies that the associated UCI transmission is dropped.

In one version of the above embodiment, if the second offset index would be larger than the number of entries in the table mapping offset indices to beta factors, or if the offset index would correspond to a reserved entry in the table mapping offset indices to beta factors, then the second offset index is set to the largest entry in the table corresponding to a non-reserved entry.

Scaling Factor for UCI

The scaling factor, typically labeled "$\alpha$," is used to limit the number of resource elements assigned to UCI on PUSCH. The total amount of resources occupied by UCI (including HARQ-ACK bits, CSI-part1, CSI-part2) cannot exceed $\alpha \times MUCI$, where MUCI is the total number of resource elements that can be used for transmission of UCI within the OFDM symbols occupied by the PUSCH. Here the PUSCH refers to the PUSCH that UCI may be multiplexed onto.

Similar to beta factors, the scaling factors can be adaptively adjusted according to UCI priority and/or PUSCH priority.

PUSCH Associated With Dynamic Grant

In one embodiment, a new scaling factor $\alpha$ is defined for a PUSCH associated with dynamic grant and high priority. Value 0 is allowed to indicate that no UCI is to be multiplexed onto the high priority PUSCH.

```
UCI-OnPUSCH ::=    SEQUENCE {
    betaOffsets        CHOICE {
        dynamic            SEQUENCE (SIZE (4)) OF BetaOffsets,
        semiStatic         BetaOffsets
    }                  OPTIONAL, -- Need M
    scaling            ENUMERATED { f0p5, f0p65, f0p8, f1 }
    scaling-v16        ENUMERATED { f0, f0p3, f0p7, f1 } -- ***
NEW ***
}
```

PUSCH Associated With UL Configured Grant

In one embodiment, scaling factor $\alpha$ is separately defined for a PUSCH associated with UL configured grant. Periodic deterministic Time Sensitive Networking (TSN) packets are expected to be carried by PUSCHs associated with UL configured grants. For such high priority UL CG PUSCHs, the scaling factor $\alpha$ can be set preferably lower than dynamically scheduled PUSCH, including having the value of 0. This is illustrated below.

```
CG-UCI-OnPUSCH ::=   CHOICE {
    dynamic           SEQUENCE (SIZE (1..4)) OF BetaOffsets,
    semiStatic        BetaOffsets
    scaling           ENUMERATED { f0, f0p5, f0p8, f1 } --
*** NEW ***
}
```

HARQ-ACK in Response to HIGH PRIORITY DL-SCH

For HARQ-ACK in response to high priority DL-SCHs, high priority should be designated in the transmission of HARQ-ACK bits as well.

The scaling factor α can therefore be adjusted upwards to give the HARQ-ACK higher reliability. For example, $\alpha_{highPrio}$ can be used instead of α in calculating the number of coded bits for HARQ-ACK.

$$\alpha_{highPrio} = \min(1, 2*\alpha)$$

For CSI (both CSI-part1 and CSI-part2), α can be used as in Rel-15, since CSI bits typically do not need to be assigned high priority.

High Priority CSI

In certain special cases, the gNB may need to receive reliable CSI feedback from UE urgently, in order to schedule highly reliable data transmission of URLLC. In such special cases, the high priority CSI may also use $\alpha_{highPrio}$ instead of α in calculating the maximum allowed coded bits for CSI.

EXAMPLES

Figure 3:
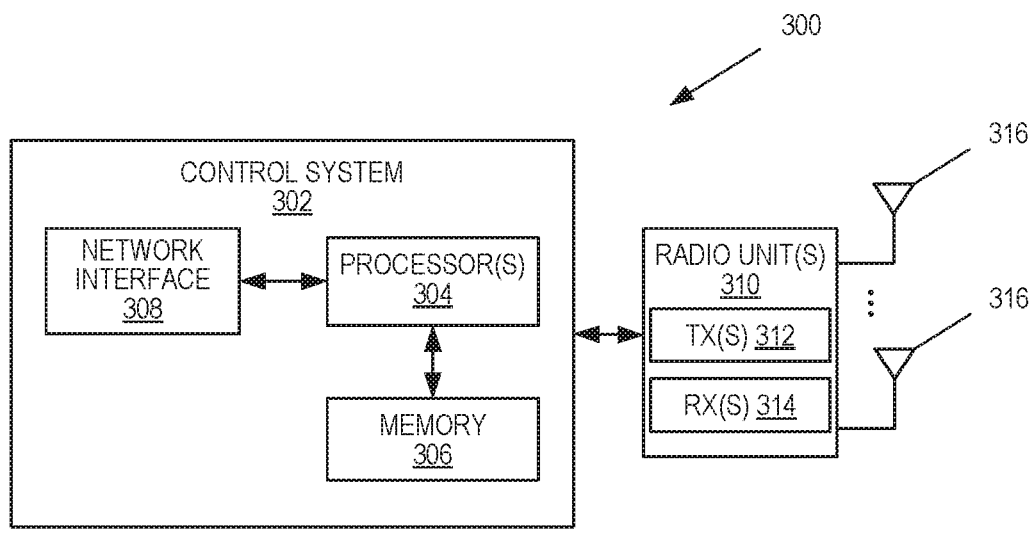
FIG. 3 is a schematic block diagram of a radio access node, according to some embodiments of the present disclosure.

FIG. 3 is a schematic block diagram of a radio access node 300 according to some embodiments of the present disclosure. The radio access node 300 may be, for example, a base station 102 or 106. As illustrated, the radio access node 300 includes a control system 302 that includes one or more processors 304 (e.g., Central Processing Units (CPUs), Application Specific Integrated Circuits (ASICs), Field Programmable Gate Arrays (FPGAs), and/or the like), memory 306, and a network interface 308. The one or more processors 304 are also referred to herein as processing circuitry. In addition, the radio access node 300 includes one or more radio units 310 that each includes one or more transmitters 312 and one or more receivers 314 coupled to one or more antennas 316. The radio units 310 may be referred to or be part of radio interface circuitry. In some embodiments, the radio unit(s) 310 is external to the control system 302 and connected to the control system 302 via, e.g., a wired connection (e.g., an optical cable). However, in some other embodiments, the radio unit(s) 310 and potentially the antenna(s) 316 are integrated together with the control system 302. The one or more processors 304 operate to provide one or more functions of a radio access node 300 as described herein. In some embodiments, the function(s) are implemented in software that is stored, e.g., in the memory 306 and executed by the one or more processors 304.

Figure 4:
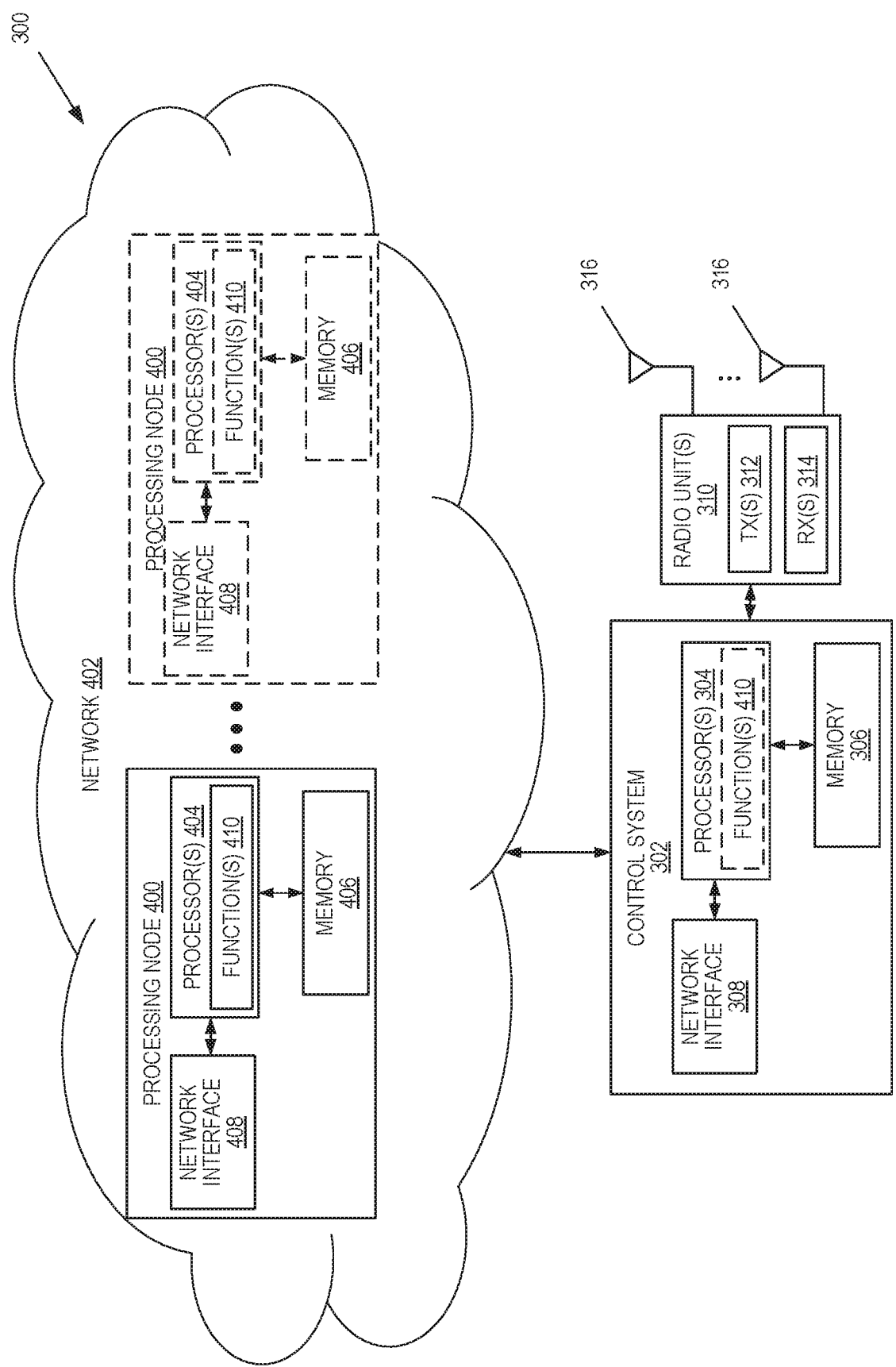
FIG. 4 is a schematic block diagram that illustrates a virtualized embodiment of the radio access node, according to some embodiments of the present disclosure.

FIG. 4 is a schematic block diagram that illustrates a virtualized embodiment of the radio access node 300 according to some embodiments of the present disclosure. This discussion is equally applicable to other types of network nodes. Further, other types of network nodes may have similar virtualized architectures.

As used herein, a "virtualized" radio access node is an implementation of the radio access node 300 in which at least a portion of the functionality of the radio access node 300 is implemented as a virtual component(s) (e.g., via a virtual machine(s) executing on a physical processing node(s) in a network(s)). As illustrated, in this example, the radio access node 300 includes the control system 302 that includes the one or more processors 304 (e.g., CPUs, ASICs, FPGAs, and/or the like), the memory 306, and the network interface 308 and the one or more radio units 310 that each includes the one or more transmitters 312 and the one or more receivers 314 coupled to the one or more antennas 316, as described above. The control system 302 is connected to the radio unit(s) 310 via, for example, an optical cable or the like. The control system 302 is connected to one or more processing nodes 400 coupled to or included as part of a network(s) 402 via the network interface 308. Each processing node 400 includes one or more processors 404 (e.g., CPUs, ASICs, FPGAs, and/or the like), memory 406, and a network interface 408.

In this example, functions 410 of the radio access node 300 described herein are implemented at the one or more processing nodes 400 or distributed across the control system 302 and the one or more processing nodes 400 in any desired manner. In some particular embodiments, some or all of the functions 410 of the radio access node 300 described herein are implemented as virtual components executed by one or more virtual machines implemented in a virtual environment(s) hosted by the processing node(s) 400. As will be appreciated by one of ordinary skill in the art, additional signaling or communication between the processing node(s) 400 and the control system 302 is used in order to carry out at least some of the desired functions 410. Notably, in some embodiments, the control system 302 may not be included, in which case the radio unit(s) 310 communicate directly with the processing node(s) 400 via an appropriate network interface(s).

In some embodiments, a computer program including instructions which, when executed by at least one processor, causes the at least one processor to carry out the functionality of radio access node 300 or a node (e.g., a processing node 400) implementing one or more of the functions 410 of the radio access node 300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 5:
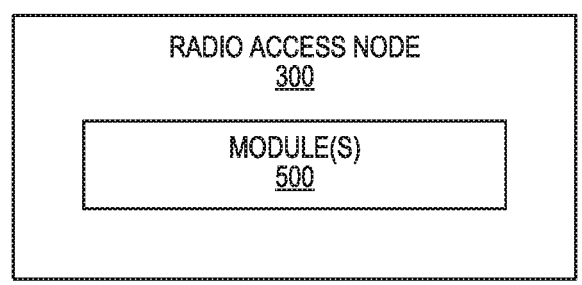
FIG. 5 is a schematic block diagram of the radio access node, according to some other embodiments of the present disclosure.

FIG. 5 is a schematic block diagram of the radio access node 300 according to some other embodiments of the present disclosure. The radio access node 300 includes one or more modules 500, each of which is implemented in software. The module(s) 500 provide the functionality of the radio access node 300 described herein. This discussion is equally applicable to the processing node 400 of FIG. 4 where the modules 500 may be implemented at one of the processing nodes 400 or distributed across multiple processing nodes 400 and/or distributed across the processing node(s) 400 and the control system 302.

Figure 6:
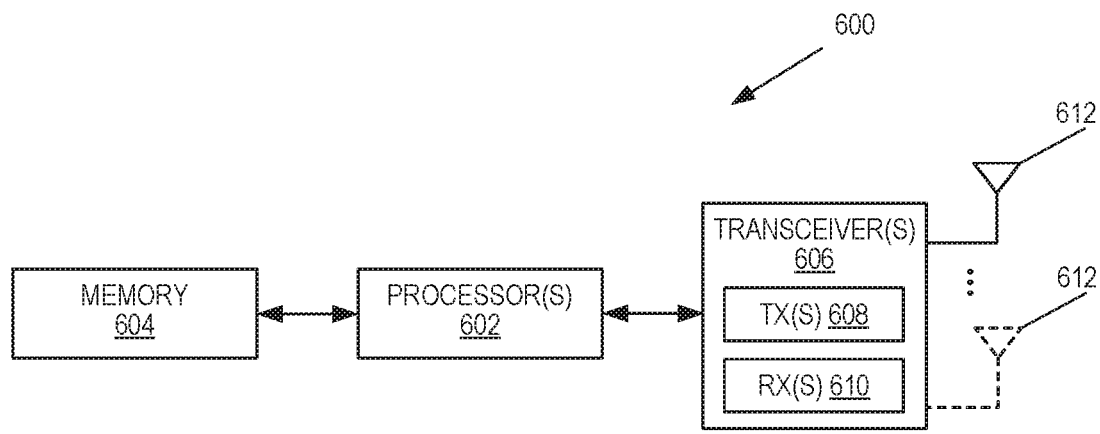
FIG. 6 is a schematic block diagram of a User Equipment (UE), according to some embodiments of the present disclosure.

FIG. 6 is a schematic block diagram of a UE 600 according to some embodiments of the present disclosure. As illustrated, the UE 600 includes one or more processors 602 (e.g., CPUs, ASICs, FPGAs, and/or the like), memory 604, and one or more transceivers 606 each including one or more transmitters 608 and one or more receivers 610 coupled to one or more antennas 612. The transceiver(s) 606 includes radio-front end circuitry connected to the antenna(s) 612 that is configured to condition signals communicated between the antenna(s) 612 and the processor(s) 602, as will be appreciated by on of ordinary skill in the art. The processors 602 are also referred to herein as processing circuitry. The transceivers 606 are also referred to herein as radio circuitry. In some embodiments, the functionality of the UE 600 described above may be fully or partially implemented in software that is, e.g., stored in the memory 604 and executed by the processor(s) 602. Note that the UE 600 may include additional components not illustrated in FIG. 6 such as, e.g., one or more user interface components (e.g., an input/output interface including a display, buttons, a touch screen, a microphone, a speaker(s), and/or the like and/or any other components for allowing input of information into the UE 600 and/or allowing output of information from the UE 600), a power supply (e.g., a battery and associated power circuitry), etc.

In some embodiments, a computer program including instructions which, when executed by at least one processor, causes the at least one processor to carry out the functionality of the UE 600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 7:
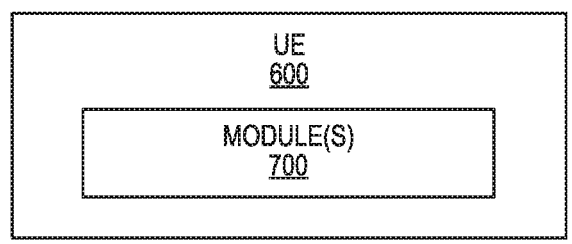
FIG. 7 is a schematic block diagram of the UE, according to some other embodiments of the present disclosure.

FIG. 7 is a schematic block diagram of the UE 600 according to some other embodiments of the present disclosure. The UE 600 includes one or more modules 700, each of which is implemented in software. The module(s) 700 provide the functionality of the UE 600 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Embodiments

Embodiment 1. A method for priority-dependent Uplink Control Information (UCI) resource determination, the method comprising: determining that there are multiple UCIs to be multiplexed onto a Physical Uplink Shared Channel, PUSCH; determining the priorities of the UCIs and the PUSCH; determining beta offset value for UCI based on the priorities of the UCI and/or the Physical Uplink Shared Channel (PUSCH) that the UCI is to be multiplexed on; setting or adjusting a UCI code rate based on the beta offset value; and transmitting a UCI according to the UCI code rate.

Embodiment 2. The method of embodiment 1 wherein the beta offset value for UCI comprises a beta offset value for Hybrid Automatic Request Acknowledge (HARQ-ACK) or a beta offset value for Channel State Information (CSI).

Embodiment 3. The method of embodiment 1 or 2 comprising determining beta offset values for a plurality of UCI messages.

Embodiment 4. The method of embodiment 3, wherein the beta offset value of each of the plurality of UCIs is determined separately based on the priority of the respective UCI and the PUSCH.

Embodiment 5. The method of embodiment 3, wherein one beta offset is determined for multiple UCIs to be multiplexed on PUSCH based on the priority of all the UCIs and the PUSCH.

Embodiment 6. The method of any of embodiments 3-5 wherein the beta offset value for each of the plurality of UCIs is determined based on an indicated or configured beta factor.

Embodiment 7. The method of any of embodiments 1-6 wherein the beta offset value is determined from a table indexed by a combination of UCI and PUSCH priorities, determined from a defined formula that considers a combination of UCI and PUSCH priorities, and/or determined based on higher layer priorities.

Embodiment 8. The method of any of embodiments 1-7 wherein a UCI or PUSCH priority is explicitly indicated in the Download Control Information (DCI), semi-statically configured, and/or derived from other indicators.

Embodiment 9. The method of any of embodiments 1-7 wherein a PUSCH priority is explicitly indicated in an UL scheduling grant or activation grant or is semi-statically configured.

Embodiment 10. The method of any of embodiments 1-9 wherein HARQ-ACK for a Physical Downlink Shared Channel (PDSCH) has the same priority as the priority of PDSCH.

Embodiment 11. The method of any of embodiments 1-10 wherein a PDSCH priority is indicated in the Downlink (DL) scheduling DCI.

Embodiment 12. The method of any of embodiments 1-11 wherein a PDSCH priority is semi-statically configured.

Embodiment 13. The method of any of embodiments 1-12 wherein an aperiodic CSI (A-CSI) has the same priority as the priority indicator in a UL grant requesting the CSI.

Embodiment 14. The method of embodiments 13 wherein the A-CSI always has the lowest priority with respect to other UCI and PUSCH.

Embodiment 15. The method of embodiment 13 or 14 wherein the priority of the A-CSI is semi-statically configured.

Embodiment 16. The method of any of embodiments 13-15 wherein the beta offset of the A-CSI is identical to or is derived from the beta offset indicator in the DCI.

Embodiment 17. The method of any of embodiments 13-15 wherein the beta offset of the A-CSI is determined from a combination of a beta offset indicator in the DCI and a priority of the PUSCH.

Embodiment 18. The method of any of embodiments 13-17 wherein a priority of a specific A-CSI that is determined based on a PDSCH Demodulation Reference Signal (DMRS) to be multiplexed on PUSCH is the same as the priority of the PDSCH.

Embodiment 19. The method of any of embodiments 1-18 wherein the beta offset value for a UCI multiplexed in PUSCH is determined based on the configuration used, wherein the configuration used comprises a configuration type or number used in UL with multiple Configured Grants (CGs).

Embodiment 20. The method of embodiment 19 wherein different configurations carry different traffic with different reliabilities or priorities.

Embodiment 21. The method of any of embodiments 1-20 wherein, where a dynamic grant follows a failed UL transmission in a CG, the determination of beta offset value for the UCI transmitted in (retransmission) the PUSCH utilizes the information for a given CG where the initial UL transmission happened (type or number) out of multiple CGs.

Embodiment 22. The method of any of embodiments 1-21 wherein the beta offset value for the first transmission opportunity in the CG period is combined with a priority value to determining beta offset value.

Embodiment 23. A User Equipment (UE), for priority-dependent Uplink Control Information (UCI) resource determination, the UE comprising: one or more processors; and memory storing instructions executable by the one or more processors, whereby the UE is operable to perform any of the steps of any of the methods disclosed herein.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
ACK Acknowledge/Acknowledgement
A-CSI Aperiodic Channel State Information
AN Access Network
AP Access Point
ASIC Application Specific Integrated Circuit
CBGTI Code Block Group Transmission Information
CG Configured Grant
CPU Central Processing Unit
CRC Cyclic Redundancy Check
CSI Channel State Information
DCI Downlink Control Information
DL Downlink
DMRS Demodulation Reference Signal
DN Data Network
DSP Digital Signal Processor
eMBB enhanced Mobile Broadband
eNB Enhanced or Evolved Node B
FPGA Field Programmable Gate Array
gNB New Radio Base Station
GSM Global System for Mobile Communications
HARQ Hybrid Automatic Repeat Request
LTE Long Term Evolution
MME Mobility Management Entity
MTC Machine Type Communication
NR New Radio
OFDM Orthogonal Frequency Division Multiplexing
PDSCH Physical Downlink Shared Channel
P-GW Packet Data Network Gateway
PTRS Phase Tracking Reference Signal
PUSCH Physical Uplink Shared Channel
RAM Random Access Memory
RAN Radio Access Network
ROM Read Only Memory
RRC Radio Resource Control
RRH Remote Radio Head
SCEF Service Capability Exposure Function
SCH Shared Channel
SPS Semi-Persistent Scheduling
TS Technical Specification
UCI Uplink Control Information
UE User Equipment
UL Uplink
URLLC Ultra-Reliable, Low Latency Communication Those skilled in the art will recognize improvements and modifications to the embodiments of the present disclosure. All such improvements and modifications are considered within the scope of the concepts disclosed herein.

What is claimed is:

1. A method of operating a wireless device for priority-dependent Uplink Control Information, UCI, resource determination, the method comprising:
   determining that one or more UCIs are to be multiplexed onto a Physical Uplink Shared Channel, PUSCH;
   determining priorities of the PUSCH and/or each of the one or more UCIs;
   determining at least one beta offset value for the one or more UCIs based on one or more of the priorities of the PUSCH and/or each of a plurality of UCIs;
   setting or adjusting a UCI code rate based on the at least one beta offset value; and
   transmitting a UCI according to the UCI code rate;
   wherein determining the at least one beta offset value for the UCI comprises determining beta offset values for a plurality of UCI messages based on the one or more of the priorities of the PUSCH and each of the plurality of UCIs;
   wherein one beta offset value of the at least one beta offset value is determined for multiple UCIs to be multiplexed on the PUSCH based on a priority of all the UCIs and the PUSCH; and
   wherein a beta offset value of the at least one beta offset value for a first transmission opportunity in a Configured Grant, CG, period is combined with a priority value to determine the beta offset value.

2. The method of claim 1 wherein the at least one beta offset value for the one or more UCI comprises a beta offset value for Hybrid Automatic Request Acknowledge, HARQ-ACK, or a beta offset value for Channel State Information, CSI.

3. The method of claim 1 wherein the beta offset value of each of the plurality of UCIs is determined separately based on a priority of the respective UCI and the PUSCH.

4. The method of claim 1 wherein the beta offset value for each of the plurality of UCIs is determined based on an indicated or configured beta factor.

5. The method of claim 1 wherein the beta offset value is one of the group consisting of:
   determined from a table indexed by a combination of UCI and PUSCH priorities;
   determined from a defined formula that considers a combination of UCI and PUSCH priorities; and
   determined based on higher layer priorities.

6. The method of claim 1 wherein the UCI or PUSCH priority is explicitly indicated in the Download Control Information, DCI, semi-statically configured, and/or derived from other indicators.

7. The method of claim 1 wherein the PUSCH priority is explicitly indicated in an uplink, UL, scheduling grant or activation grant or is semi-statically configured.

8. The method of claim 1 wherein the HARQ-ACK for a Physical Downlink Shared Channel, PDSCH, has a same priority as the priority of the PDSCH.

9. The method of claim 8 wherein the PDSCH priority is indicated in Downlink, DL, scheduling DCI.

10. The method of claim 9 wherein the PDSCH priority is semi-statically configured.

11. The method of claim 1 wherein an Aperiodic CSI, A-CSI, has a same priority as a priority indicator in a UL grant requesting the CSI.

12. The method of claim 11 wherein the A-CSI always has a lowest priority with respect to other UCIs and PUSCHs.

13. The method of claim 11 wherein the priority of the A-CSI is semi-statically configured.

14. The method of claim 11 wherein the beta offset value of the A-CSI is identical to or is derived from a beta offset indicator in the DCI.

15. The method of claim 11 wherein the beta offset value of the A-CSI is determined from a combination of a beta offset indicator in the DCI and the priority of the PUSCH.

16. The method of claim 11 wherein a priority of a specific A-CSI that is determined based on a PDSCH Demodulation Reference Signal, DMRS, to be multiplexed on the PUSCH is the same as the priority of the PDSCH.

17. The method of claim 1 wherein the beta offset value for one of the UCIs multiplexed in the PUSCH is determined based on a configuration used, wherein the configuration used comprises a configuration type or number used in a UL with multiple Configured Grants, CGs.

18. The method of claim 17 wherein different configurations carry different traffic with different reliabilities or priorities.

19. The method of claim 1 wherein, where a dynamic grant follows a failed UL transmission in a CG, the determination of the beta offset value for the UCI transmitted in the PUSCH utilizes information for a given CG where an initial UL transmission happened out of multiple CGs.

20. A method of operating a radio network node for priority-dependent Uplink Control Information, UCI, resource determination, the method comprising:
  determining that a plurality of UCIs are to be multiplexed onto a Physical Uplink Shared Channel, PUSCH; and
  receiving a UCI according to a UCI code rate based on at least one beta offset value determined based on one or more of priorities of the PUSCH and each of the plurality of UCIs;
  wherein the at least one beta offset value for the UCI comprises beta offset values for a plurality of UCI messages based on one or more of the priorities of the PUSCH and each of the plurality of UCIs;
  wherein one beta offset value of the at least one beta offset value is determined for multiple UCIs to be multiplexed on the PUSCH based on a priority of all the UCIs and the PUSCH; and
  wherein a beta offset value of the at least one beta offset value for a first transmission opportunity in a Configured Grant, CG, period is combined with a priority value to determine the beta offset value.

21. The method of claim 20 wherein the beta offset value for the UCI comprises a beta offset value for Hybrid Automatic Request Acknowledge, HARQ-ACK, or a beta offset value for Channel State Information, CSI.

22. The method of claim 21 wherein the beta offset value of each of the plurality of UCIs is determined separately based on a priority of the respective UCI and the PUSCH.

23. The method of claim 21 wherein the beta offset value for each of the plurality of UCIs is determined based on an indicated or configured beta factor.

24. A wireless device for priority-dependent Uplink Control Information, UCI, resource determination, the wireless device comprising:
  one or more processors; and
  memory storing instructions executable by the one or more processors, whereby the wireless device is operable to:
    determine that one or more UCIs are to be multiplexed onto a Physical Uplink Shared Channel, PUSCH;
    determine priorities of the PUSCH and/or each of the one or more UCIs;
    determine at least one beta offset value for the one or more UCIs based on one or more of the priorities of the PUSCH and/or each of a plurality of UCIs;
    set or adjust a UCI code rate based on the at least one beta offset value; and
    transmit a UCI according to the UCI code rate;
    wherein determining the at least one beta offset value for the UCI comprises determining beta offset values for a plurality of UCI messages based on the one or more of the priorities of the PUSCH and each of the plurality of UCIs;
    wherein one beta offset value of the at least one beta offset value is determined for multiple UCIs to be multiplexed on the PUSCH based on a priority of all the UCIs and the PUSCH; and
    wherein a beta offset value of the at least one beta offset value for a first transmission opportunity in a Configured Grant, CG, period is combined with a priority value to determine the beta offset value.

25. A network node for priority-dependent Uplink Control Information, UCI, resource determination, the network node comprising:
  one or more processors; and
  memory comprising instructions to cause the network node to:
    determine that a plurality of UCIs are to be multiplexed onto a Physical Uplink Shared Channel, PUSCH; and
    receive a UCI according to a UCI code rate based on at least one beta offset value determined based on one or more of priorities of the PUSCH and each of the plurality of UCIs;
    wherein the at least one beta offset value for the UCI comprises beta offset values for a plurality of UCI messages based on the one or more of the priorities of the PUSCH and each of the plurality of UCIs;
    wherein one beta offset value of the at least one beta offset value is determined for multiple UCIs to be multiplexed on the PUSCH based on a priority of all the UCIs and the PUSCH; and
    wherein a beta offset value of the at least one beta offset value for a first transmission opportunity in a Configured Grant, CG, period is combined with a priority value to determine the beta offset value.

* * * * *